US009552654B2

(12) United States Patent
Barnhoefer

(10) Patent No.: US 9,552,654 B2
(45) Date of Patent: Jan. 24, 2017

(54) SPATIO-TEMPORAL COLOR LUMINANCE DITHERING TECHNIQUES

(71) Applicant: Apple Inc., Cupertino, CA (US)

(72) Inventor: Ulrich T. Barnhoefer, Cupertino, CA (US)

(73) Assignee: Apple Inc., Cupertino, CA (US)

(*) Notice: Subject to any disclaimer, the term of this patent is extended or adjusted under 35 U.S.C. 154(b) by 10 days.

(21) Appl. No.: 14/178,178

(22) Filed: Feb. 11, 2014

(65) Prior Publication Data

US 2014/0160146 A1 Jun. 12, 2014

Related U.S. Application Data

(62) Division of application No. 12/970,543, filed on Dec. 16, 2010, now abandoned.

(51) Int. Cl.
| | |
|---|---|
| *G06T 11/00* | (2006.01) |
| *G09G 3/20* | (2006.01) |
| *H04N 1/52* | (2006.01) |
| *G09G 5/02* | (2006.01) |

(52) U.S. Cl.
CPC .......... *G06T 11/001* (2013.01); *G09G 3/2003* (2013.01); *G09G 3/2055* (2013.01); *G09G 3/2074* (2013.01); *H04N 1/52* (2013.01); *G09G 5/02* (2013.01); *G09G 2320/0242* (2013.01); *G09G 2340/0414* (2013.01);
(Continued)

(58) Field of Classification Search
CPC . G06T 7/40; G06T 7/0079; G06T 2207/20112
See application file for complete search history.

(56) References Cited

U.S. PATENT DOCUMENTS

| | | |
|---|---|---|
| 6,476,824 B1 | 11/2002 | Suzuki |
| 7,352,373 B2 | 4/2008 | Feng |
| 7,420,570 B2 | 9/2008 | Xu |

(Continued)

FOREIGN PATENT DOCUMENTS

| | | |
|---|---|---|
| CN | 101317213 A | 12/2008 |
| CN | 101908205 A | 12/2010 |

(Continued)

OTHER PUBLICATIONS

European Partial Search Report for European Patent Application No. 11192268.8 dated Mar. 30, 2012, 6 pgs.
(Continued)

*Primary Examiner* — Antonio A Caschera
(74) *Attorney, Agent, or Firm* — Blank Rome LLP

(57) ABSTRACT

Embodiments include techniques that use color-shifting and luminance for creation and display of spatio-temporal dithered images. In one embodiment, adjacent pixels are color-shifted with respect to each other and the color values of the adjacent pixels are temporally alternated with color values of pixels in the group. In another embodiment, the luminance of group of adjacent pixels is determined and the luminance of the group is made more homogenous, spatially and temporally, by distributing color variations over a larger number of pixels so as to reduce the luminance difference between the pixel with the least luminance and the pixel with the greatest luminance. Individual color components (e.g., red, green, blue) may also be separated and used so that the color-shifts associated with each color component may be simultaneously present in different pixels.

6 Claims, 10 Drawing Sheets

(52) U.S. Cl.
CPC ............... *G09G 2340/0421* (2013.01); *G09G 2340/0428* (2013.01); *G09G 2360/16* (2013.01)

(56) References Cited

U.S. PATENT DOCUMENTS

| | | |
|---|---|---|
| 7,554,555 B2 | 6/2009 | Daly |
| 2003/0179393 A1 | 9/2003 | Huovinen |
| 2005/0185001 A1 | 8/2005 | Feng |
| 2006/0221095 A1 | 10/2006 | Xu |
| 2006/0233438 A1 | 10/2006 | Xu |
| 2007/0153332 A1 | 7/2007 | Kim |
| 2008/0158269 A1 | 7/2008 | Wang |
| 2009/0303227 A1 | 12/2009 | Hwang |
| 2012/0154428 A1 | 6/2012 | Barnhoefer |

FOREIGN PATENT DOCUMENTS

| | | |
|---|---|---|
| EP | 1589513 A2 | 10/2005 |
| WO | 2009157915 A1 | 12/2009 |

OTHER PUBLICATIONS

Extended European Search Report for European Patent Application No. 11192268.8 dated Aug. 27, 2012, 22 pgs.
International Search Report for PCT No. PCT/US2011/064478 dated Jul. 19, 2012; 7 pages.
Office Action received in corresponding KR Application No. 10-2011-135711, dated Jun. 1, 2013.
Wright, Steven L. et al. "Color and Luminance Management for High-Resolution Liquid-Crystal Displays". May 20, 2003. pp. 940-943. SID International Symposium Digest of Technical Papers. San Jose, CA USA.

SPATIO-TEMPORAL COLOR LUMINANCE DITHERING TECHNIQUES

CROSS-REFERENCE TO RELATED APPLICATIONS

This is a division of U.S. patent application Ser. No. 12/970,543, by Dr. Ulrich T. Barnhoefer, entitled Spatio-Temporal Color Luminance Dithering Techniques, filed Dec. 16, 2010, which is incorporated by reference herein in its entirety.

BACKGROUND OF THE INVENTION

The present disclosure relates generally to techniques for dithering images using a luminance approach.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In recent years, electronic display devices have become increasingly popular due, at least in part, to such devices becoming more and more affordable for the average consumer. Further, in addition to a number of electronic display devices currently available for desktop monitors and notebook computers, it is not uncommon for digital display devices to be integrated as part of another electronic device, such as a cellular phone, a tablet computing device, or a portable media player.

Electronic displays are typically configured to output a set number of colors within a color range. In certain cases, a graphical image to be displayed may have a number of colors greater than the number of colors that are capable of being shown by the electronic display. For example, a graphical image may be encoded with a 24-bit color depth (e.g., 8 bits for each of red, green, and blue components of the image), while an electronic display may be configured to provide output images at an 18-bit color depth (e.g., 6 bits for each of red, green, and blue components of the image). Rather than simply discarding least-significant bits, dithering techniques may be used to output a graphical image that appears to be a closer approximation of the original color image. However, the dithering techniques may not approximate the original image as closely as desired.

SUMMARY OF THE INVENTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to dithering techniques that may be used to display color images on an electronic display. The electronic display may include one or more electronic components, including a power source, pixelation hardware (e.g., light emitting diodes, liquid crystal display), and circuitry for receiving signals representative of image data to be displayed. In certain embodiments, a processor may be internal to the display while in other embodiments the processor may be external to the display and included as part of an electronic device, such as a computer workstation or a cell phone.

The processor may use dithering techniques, including spatial and temporal dithering techniques disclosed herein, to output color images on the electronic display. In one embodiment, adjacent pixels are color-shifted with respect to each other and the color values of certain pixels are temporally alternated with color values of other pixels in the group. In another embodiment, the luminance of a group of adjacent pixels is determined and the luminance of the group is made more homogenous spatially and temporally by distributing color variations over a larger number of pixels so as to reduce the luminance difference between the pixel with the least luminance and the pixel with the greatest luminance. Individual color components (e.g., red, green, blue) may also be separated and used so that the color-shifts associated with each color component may be simultaneously present in different pixels.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIGS. 11-14 are generally illustrative of an example of temporal dithering, in accordance with one embodiment of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As will be discussed below, the present disclosure relates generally to techniques for processing and displaying image data on an electronic display device. In particular, certain aspects of the present disclosure may relate to techniques for processing images using temporal and spatial dithering techniques. Further, it should be understood that the presently disclosed techniques may be applied to both still images and moving images (e.g., video), and may be utilized in any suitable type of electronic display, such as a cell phone, a desktop computer monitor, a tablet computing device, an e-book reader, a television, and so forth.

Figure 1:
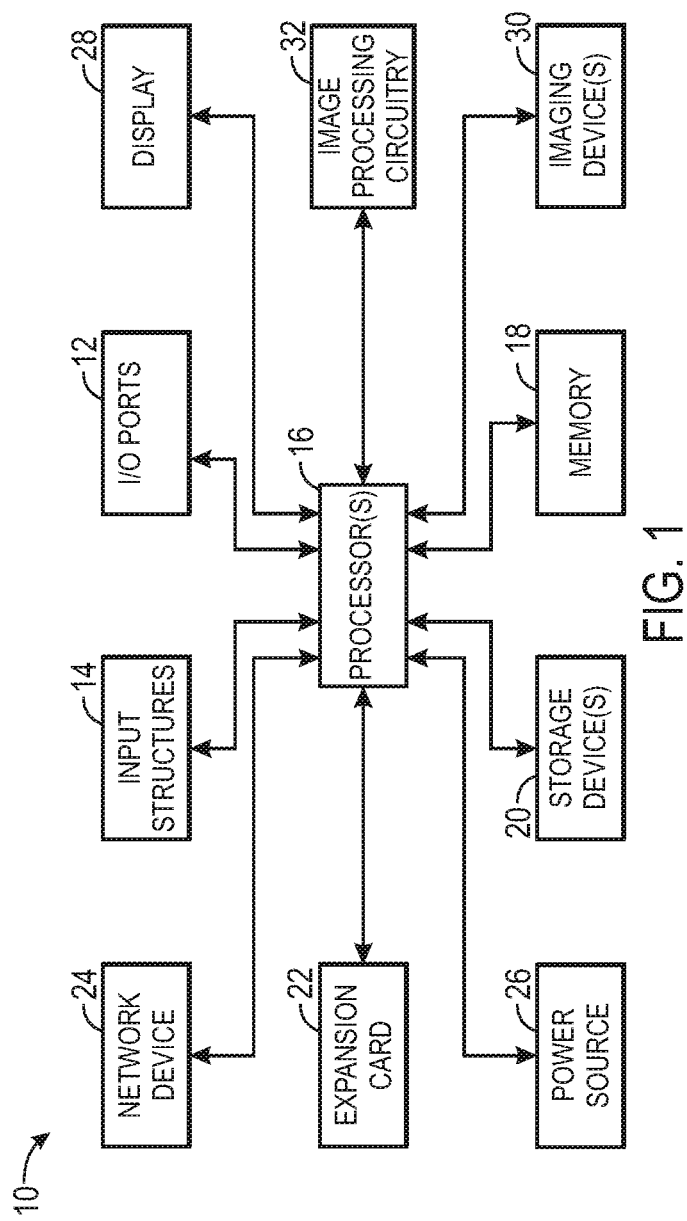
FIG. 1 is a simplified block diagram depicting components of an example of an electronic device that includes image processing circuitry configured to implement one or more of the image processing techniques set forth in the present disclosure.

With the foregoing in mind, it may be beneficial to first discuss embodiments of certain display systems that may incorporate the dithering techniques as described herein. With this in mind, and turning now to the figures, FIG. 1 is a block diagram illustrating an example of an electronic device 10 that may provide for the processing of image data using one or more of the image processing techniques mentioned above. The electronic device 10 may be any type of electronic device, such as a laptop or desktop computer, a mobile phone, a digital media player, a television, or the like, that is configured to process and display image data. By way of example only, the electronic device 10 may be a portable electronic device, such as a model of an iPad®, iPod® or iPhone®, available from Apple Inc. of Cupertino, Calif. Additionally, the electronic device 10 may be a desktop or laptop computer, such as a model of a MacBook® MacBook® Pro, MacBook Air®, iMac®, Mac® Mini, or Mac Pro®, available from Apple Inc.

Regardless of its form (e.g., portable or non-portable), it should be understood that the electronic device 10 may provide for the processing of image data using one or more of the image processing techniques briefly discussed above, which may include spatial and/or temporal dithering techniques, among others. In some embodiments, the electronic device 10 may apply such image processing techniques to image data stored in a memory of the electronic device 10. Embodiments showing both portable and non-portable embodiments of the electronic device 10 will be further discussed below with respect to FIGS. 2 and 3.

As shown in FIG. 1, the electronic device 10 may include various internal and/or external components which contribute to the function of the device 10. The various functional blocks shown in FIG. 1 may include hardware elements (including circuitry), software elements (including computer code stored on a computer-readable medium) or a combination of both hardware and software elements. For example, in the presently illustrated embodiment, the electronic device 10 may include input/output (I/O) ports 12, input structures 14, one or more processors 16, memory device 18, non-volatile storage 20, expansion card(s) 22, networking device 24, power source 26, and display 28. Additionally, the electronic device 10 may include one or more imaging devices 30, such as a digital camera, and image processing circuitry 32. As will be discussed further below, the image processing circuitry 32 may be configured to implement one or more of the above-discussed image processing techniques. As can be appreciated, image data processed by image processing circuitry 32 may be retrieved from the memory 18 and/or the non-volatile storage device(s) 20, or may be acquired using the imaging device 30.

It should be understood that the system block diagram of the device 10 shown in FIG. 1 is intended to be a high-level control diagram depicting various components that may be included in such a device 10. Indeed, as discussed below, the depicted processor(s) 16 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU).

The input structures 14 may provide user input or feedback to the processor(s) 16. For instance, input structures 14 may be configured to control one or more functions of electronic device 10, such as applications running on electronic device 10. In addition to processing various input signals received via the input structure(s) 14, the processor(s) 16 may control the general operation of the device 10. For instance, the processor(s) 16 may provide the processing capability to execute an operating system, programs, user and application interfaces, and any other functions of the electronic device 10.

The processor(s) 16 may include one or more microprocessors, such as one or more "general-purpose" microprocessors, one or more special-purpose microprocessors and/or application-specific microprocessors (ASICs), or a combination of such processing components. For example, the processor(s) 16 may include one or more reduced instruction set (e.g., RISC) processors, as well as graphics processors (GPU), video (GPU), video processors, audio processors and/or related chip sets. As will be appreciated, the processor(s) 16 may be coupled to one or more data buses for transferring data and instructions between various components of the device 10. In certain embodiments, the processor(s) 16 may provide the processing capability to execute source code embodiments capable of employing the dithering techniques described herein.

The instructions or data to be processed by the processor(s) 16 may be stored in a computer-readable medium, such as a memory device 18. The memory device 18 may be provided as a volatile memory, such as random access memory (RAM) or as a non-volatile memory, such as read-only memory (ROM), or as a combination of one or more RAM and ROM devices. In addition, the memory 18 may be used for buffering or caching during operation of the electronic device 10. For instance, in one embodiment, the memory 18 includes one or more frame buffers for buffering video data as it is being output to the display 28.

In addition to the memory device 18, the electronic device 10 may further include a non-volatile storage 20 for persistent storage of data and/or instructions. The non-volatile storage 20 may include flash memory, a hard drive, or any other optical, magnetic, and/or solid-state storage media, or some combination thereof. In accordance with aspects of the present disclosure, image processing data stored in the non-volatile storage 20 and/or the memory device 18 may be processed by the image processing circuitry 32 prior to being output on a display.

The embodiment illustrated in FIG. 1 may also include one or more card or expansion slots. The card slots may be configured to receive an expansion card 22 that may be used to add functionality, such as additional memory, I/O functionality, networking capability, or graphics processing capability to the electronic device 10. The electronic device 10 also includes the network device 24, which may be a network controller or a network interface card (NIC) that may provide for network connectivity over a wireless 802.11 standard or any other suitable networking standard, such as a local area network (LAN), a wide area network (WAN).

The power source 26 of the device 10 may include the capability to power the device 10 in both non-portable and portable settings. The display 28 may be used to display various images generated by device 10, such as a GUI for an operating system, or image data (including still images and video data) processed by the image processing circuitry 32, as will be discussed further below. As mentioned above, the image data may include image data acquired using the imaging device 30 or image data retrieved from the memory 18 and/or non-volatile storage 20. The display 28 may be any suitable type of display, such as a liquid crystal display (LCD), plasma display, or an organic light emitting diode (OLED) display, for example. Additionally, as discussed above, the display 28 may be provided in conjunction with the above-discussed touch-sensitive mechanism (e.g., a touch screen) that may function as part of a control interface for the electronic device 10. The illustrated imaging device(s) 30 may be provided as a digital camera configured to acquire both still images and moving images (e.g., video).

The image processing circuitry 32 may provide for various image processing steps, such as spatial dithering, temporal dithering, pixel color-space conversion, luminance determination, luminance optimization, image scaling operations, and so forth. In some embodiments, the image processing circuitry 32 may include various subcomponents and/or discrete units of logic that collectively form an image processing "pipeline" for performing each of the various image processing steps. These subcomponents may be implemented using hardware (e.g., digital signal processors or ASICs) or software, or via a combination of hardware and software components. The various image processing operations that may be provided by the image processing circuitry 32 and, particularly those processing operations relating to spatial dithering, temporal dithering, pixel color-space conversion, luminance determination, and luminance optimization, will be discussed in greater detail below.

Figure 2:
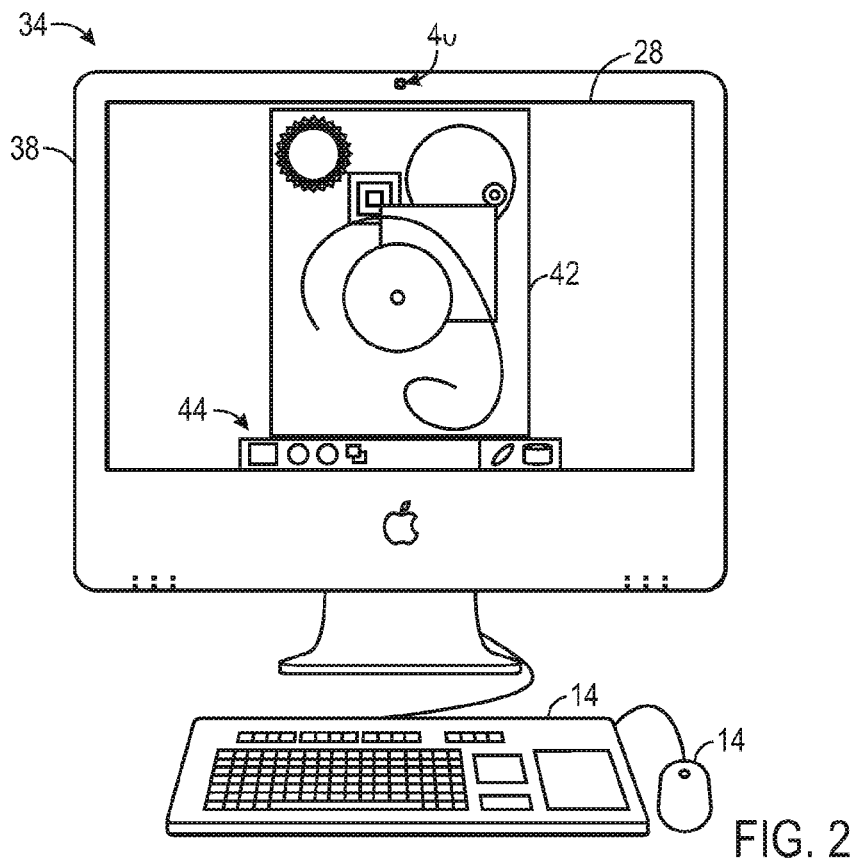
FIG. 2 is a front view of the electronic device of FIG. 1 in the form of a desktop computing device, in accordance with aspects of the present disclosure.
Figure 3:
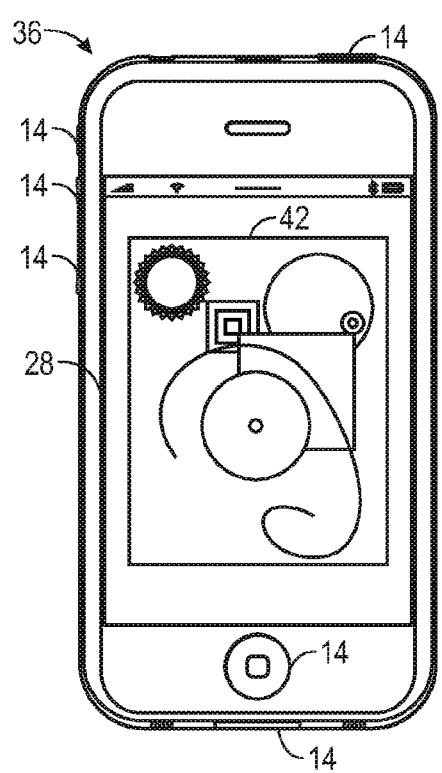
FIG. 3 is a front view of the electronic device of FIG. 1 in the form of a handheld portable electronic device, in accordance with aspects of the present disclosure.

Referring again to the electronic device 10, FIGS. 2 and 3 illustrate various forms that the electronic device 10 may take. As mentioned above, the electronic device 10 may take the form of a computer, including computers that are generally portable (such as laptop, notebook, and tablet computers) as well as computers that are generally non-portable (such as desktop computers, workstations and/or servers), or other type of electronic device, such as handheld portable electronic devices (e.g., a digital media player or mobile phone). In particular, FIGS. 2 and 3 depict the electronic device 10 in the form of a desktop computer 34 and a handheld portable electronic device 36, respectively.

FIG. 2 further illustrates an embodiment in which the electronic device 10 is provided as the desktop computer 34. As shown, the desktop computer 34 may be housed in an enclosure 38 that includes a display 28, as well as various other components discussed above with regard to the block diagram shown in FIG. 1. Further, the desktop computer 34 may include an external keyboard and mouse (input structures 14) that may be coupled to the computer 34 via one or more I/O ports 12 (e.g., USB) or may communicate with the computer 34 wirelessly (e.g., RF, Bluetooth, etc.). The desktop computer 34 also includes an imaging device 40, which may be an integrated or external camera, as discussed above. In certain embodiments, the depicted desktop computer 34 may be a model of an iMac®, Mac® mini, or Mac Pro®, available from Apple Inc.

As further shown, the display 28 may be configured to generate various images that may be viewed by a user, such as a dithered image 42. The dithered image 42 may have been generated by using, for example, the spatial and temporal dithering techniques described in more detail below. During operation of the computer 34, the display 28 may display a graphical user interface ("GUI") 44 that allows the user to interact with an operating system and/or application running on the computer 34.

Turning to FIG. 3, the electronic device 10 is further illustrated in the form of portable handheld electronic device 36, which may be a model of an iPod® or iPhone® available from Apple Inc. The handheld device 36 includes various user input structures 14 through which a user may interface with the handheld device 36. For instance, each input structure 14 may be configured to control one or more respective device functions when pressed or actuated. By way of example, one or more of the input structures 14 may be configured to invoke a "home" screen or menu to be displayed, to toggle between a sleep, wake, or powered on/off mode, to silence a ringer for a cellular phone application, to increase or decrease a volume output, and so forth. It should be understood that the understood that the illustrated input structures 14 are merely exemplary, and that the handheld device 36 may include any number of suitable user input structures existing in various forms including buttons, switches, keys, knobs, scroll wheels, and so forth. In the depicted embodiment, the handheld device 36 includes the display device 28. The display device 28, which may be an LCD, OLED, or any suitable type of display, may display various images generated by the techniques disclosed herein. For example, the display 28 may display the dithered image 42.

Figure 4:
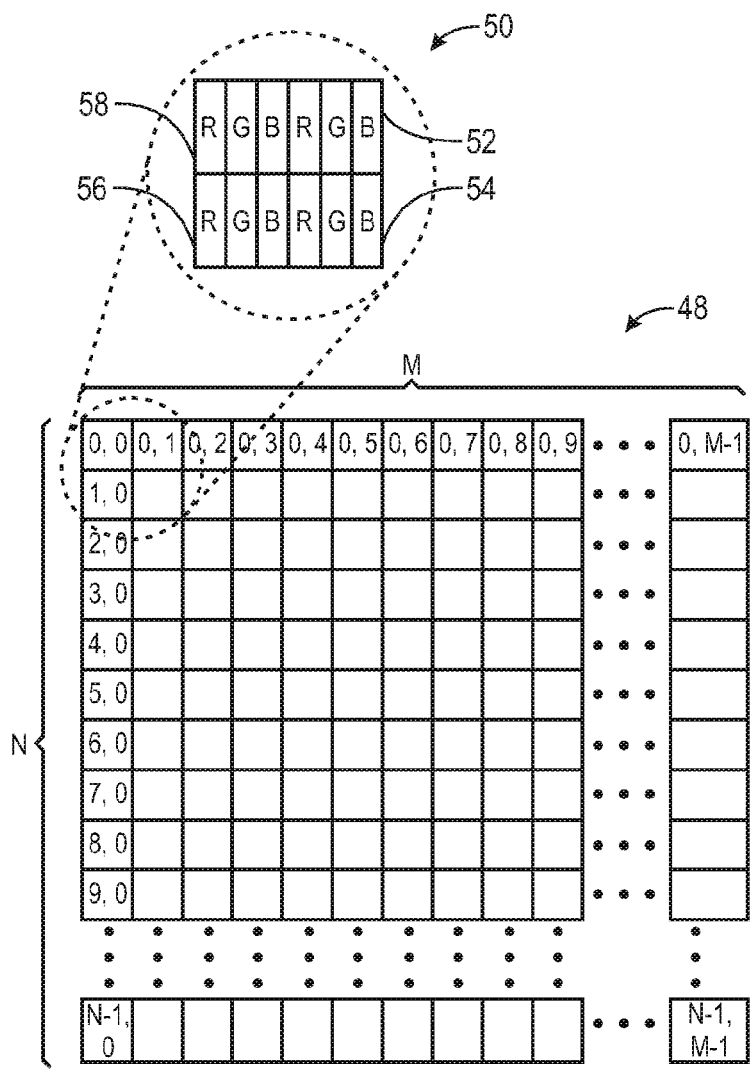
FIG. 4 shows a graphical representation of an M×N pixel array that may be included in the device of FIG. 1, in accordance with aspects of the present disclosure.

Having provided some context with regard to various forms that the electronic device 10 may take and now turning to FIG. 4, the present discussion will focus on details of the display device 28 and on the image processing circuitry 32. As mentioned above, the display device 28 may be any suitable type of display, such as a liquid crystal display (LCD), plasma display, a digital light processing (DLP) projector, an organic light emitting diode (OLED) display, and so forth. The display 28 may include a matrix of pixel elements such as an example M×N matrix 48 depicted in FIG. 4. Accordingly, the display 28 is capable of presenting an image at a natural display resolution of M×N. For example, in embodiments where the display 28 is included in a 30-inch Apple Cinema HD Display®, the natural display resolution may be approximately 2560×1600 pixels.

A pixel matrix 50 is depicted in greater detail and includes four adjacent pixels 52, 54, 56, and 58. In the depicted embodiment, each pixel of the display device 28 may include three sub-pixels capable of displaying a red (R), a green (G), and a blue (B) color. The human eye is capable of perceiving the particular RGB color combination displayed by the pixel and translating the combination into a specific color. A number of colors may be displayed by each individual pixel by varying the individual RGB intensity levels of the pixel. For example, a pixel having a level of 50% R, 50% G, and 50% B may be perceived as the color gray, while a pixel having a level of 100% R, 100% G, and 0% B may be perceived as the color yellow.

The number of colors that a pixel is capable of displaying is dependent on the hardware capabilities of the display 28. For example, a display 28 with a 6-bit color depth for each sub-pixel is capable of producing 64 ($2^6$) intensity levels for each of the R, G, and B color components. The number of bits per sub-pixel, e.g. 6 bits, is referred to as the pixel depth. At a pixel depth of 6 bits, 262,144 ($2^6 \times 2^6 \times 2^6$) color combinations are possible, while at pixel depth of 8 bits, 16,777,216 ($2^8 \times 2^8 \times 2^8$) color combinations are possible. Although the visual quality of images produced by an 8-bit pixel depth display 28 may be superior to the visual quality of images produced by a display 28 using 6-bit pixel depth, the cost of the 8-bit display 28 is also higher. Accordingly, it would be beneficial to apply imaging processing techniques, such as the techniques described herein, that are capable displaying a source image with improved visual reproduction even when utilizing lower pixel depth displays 28. Further, a source image may contain more colors than those supported by the display 28, even displays 28 having higher pixel depths. Accordingly, it would also be beneficial to apply imaging processing techniques that are capable of improved visual representation of any number of colors. Indeed, the image processing techniques described herein, such as those described in more detail with respect to FIG. 5 below, are capable of displaying improved visual reproductions at any number of pixel depths from any number of source images having a greater number of colors than that which can be output by display hardware.

Figure 5:
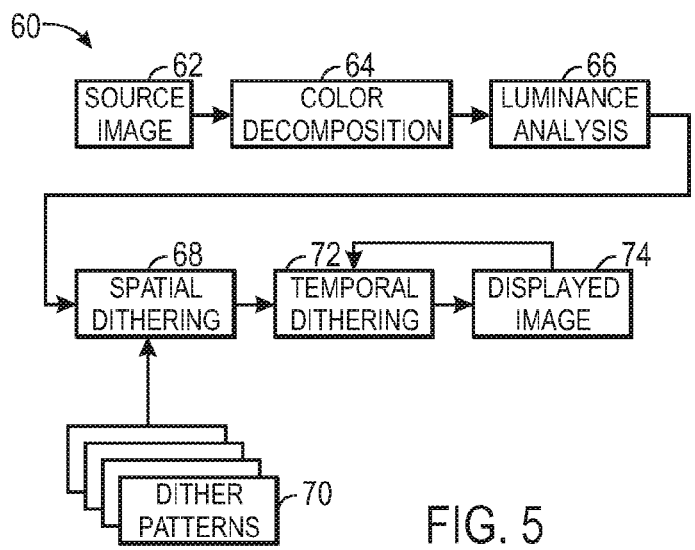
FIG. 5 is a block diagram illustrating an image signal processing (ISP) logic, in accordance with aspects of the present disclosure.

Turning to FIG. 5, the figure depicts an embodiment of an image signal processing (ISP) pipeline logic 60 that may be utilized for processing and displaying a source image 62. The ISP logic 60 may be implemented using hardware and/or software components, such as the image processing circuitry 32 of FIG. 1. A source image 62 may be provided, for example, by placing an electronic representation of the source image 62 onto embodiments of the memory 18. In such an example, the source image 62 may be placed onto frame buffer embodiments of the memory 18. The source image 62 may include colors that are not directly supported by the hardware of the electronic device 10. For example, the source image 62 may be stored at a pixel depth of 8 bits while the hardware includes a 6-bit pixel depth display 28. Accordingly, the source image 62 may be manipulated by the techniques disclosed herein so that it may be displayed in a lower pixel depth display 28.

The source image 62 may first undergo color decomposition (block 64). The color decomposition (block 64) is capable of decomposing the color of each pixel of the source image 62 into the three RGB color levels. That is, the RGB intensity levels for each pixel may be determined by the color decomposition (block 64). Such decomposition may be referred to as a three-channel decomposition, because the colors may be decomposed into a red channel, a green channel, and a blue channel, for example.

In the depicted embodiment, the source image 62 may also undergo a luminance analysis (block 66). A luminance is related to the perceived brightness of an image or an image component (such as a pixel) to the human eye. Further, humans typically perceive colors as having different luminance even if each color has equal radiance. For example, at equal radiances, humans typically perceive the color green as having higher luminance than the color red. Additionally, the color red is perceived as having a higher luminance than the color blue. In one example, a luminance formula Y may be arrived at by incorporating observations based on the perception of luminance by humans as defined below.

$$Y=0.30R+0.60G+0.10B$$

Indeed, the luminance equation Y above is an additive formula based on 30% red, 60% green, and 10% blue chromaticities (e.g., color values). The luminance formula Y can thus use the RGB color levels of a pixel to determine an approximate human perception of the luminance of the pixel. It is to be understood that because of the variability of human perception, among other factors, the values used in the luminance equation are approximate. Indeed, in other embodiments, the percentage values for R, G, and B may be different. For example, in another embodiment, the values may be approximately 29.9% red, 58.7% green, and 11.4% blue.

The luminance value of each pixel may then be utilized for spatial dithering (block 68). In spatial dithering, the image may be manipulated so as to increase the "noise" of the image, decrease color banding, and make sharp edges of the image less detectable. Spatial dithering may therefore improve the image perception and quality. In certain spatial dithering embodiments, the pixels from the source image 62 may first be converted to a lower pixel depth, for example, through a most significant bit (MSB) and a least significant bit (LSB) process, as described in more detail below with respect to FIG. 6.

Multiple dither patterns 70 may also be used during spatial dithering so as to enable a displayed image 74 to more closely approximate the source image 62. In one embodiment, two sets of dither patterns 70 and 70' may be stored in memory. In this embodiment, the set of dither patterns 70 may be used with a color channel such as green, and the set 70' may be used with color channels red and blue. In another embodiment, the dither patterns 70 (and 70') may be dynamically calculated based on the luminance analysis (block 66) and not stored in memory. In yet another embodiment, the dither patterns 70 corresponding to a single color channel, such as green, may be stored in memory. In this embodiment the dither patterns 70' may be derived based on the stored dither patterns 70. The dither patterns 70 and 70' are described in more detail below with respect to FIG. 7. In certain embodiments, a group (e.g., matrix) of pixels is made more homogenous by distributing certain RGB values of the pixels throughout the pixel group so as to more evenly distribute the luminance of the pixel matrix. Indeed, spatial dithering (block 68) may be capable of spatially distributing the colors and luminance of the source image 62 so as to enable the display of the source image 62 at a lower pixel depth while significantly preserving the perceived image quality.

Additionally, the ISP logic 60 may be capable of utilizing temporal dithering (block 72). In temporal dithering (block 72), the colors and/or luminosity of pixels may be alternated frame-by-frame so as to improve the perceived image quality of the displayed image 74. That is, a first frame of the processed image may be presented at time $T_0$, followed by a second frame of the processed image which may be presented at time $T_1$. The second frame may have color and/or luminance variations from the first frame. Likewise, a third frame of the processed image may be presented at time $T_2$ having color/and or luminance that differ from the second frame. In certain embodiments, additional frames may then be presented also having color/and or luminance values that differ from the third frame. Additionally, the temporal dithering (block 72) may iteratively loop through the frame presentations. That is, after presenting a certain n-th frame at time $T_n$, the first frame may then be presented again, followed by the second frame, and so on, up to the n-th frame and then returning to the first frame.

Humans may perceive multiple frames presented sequentially one after the other as a single image. Indeed, in some embodiments, 60, 120, 240, or more frames per second (FPS) may be presented sequentially. By alternating the color and/or the luminance of each frame and by presenting the frames sequentially, it is possible to enable a single perceived image that is more natural and pleasing to the human eye. Accordingly, the dithering techniques described herein, such as the MSB-LSB based technique described in more detail with respect to FIG. 6, may allow for the visually pleasing presentation of the displayed image 74 having a lower pixel depth than the source image 62.

Figure 6:
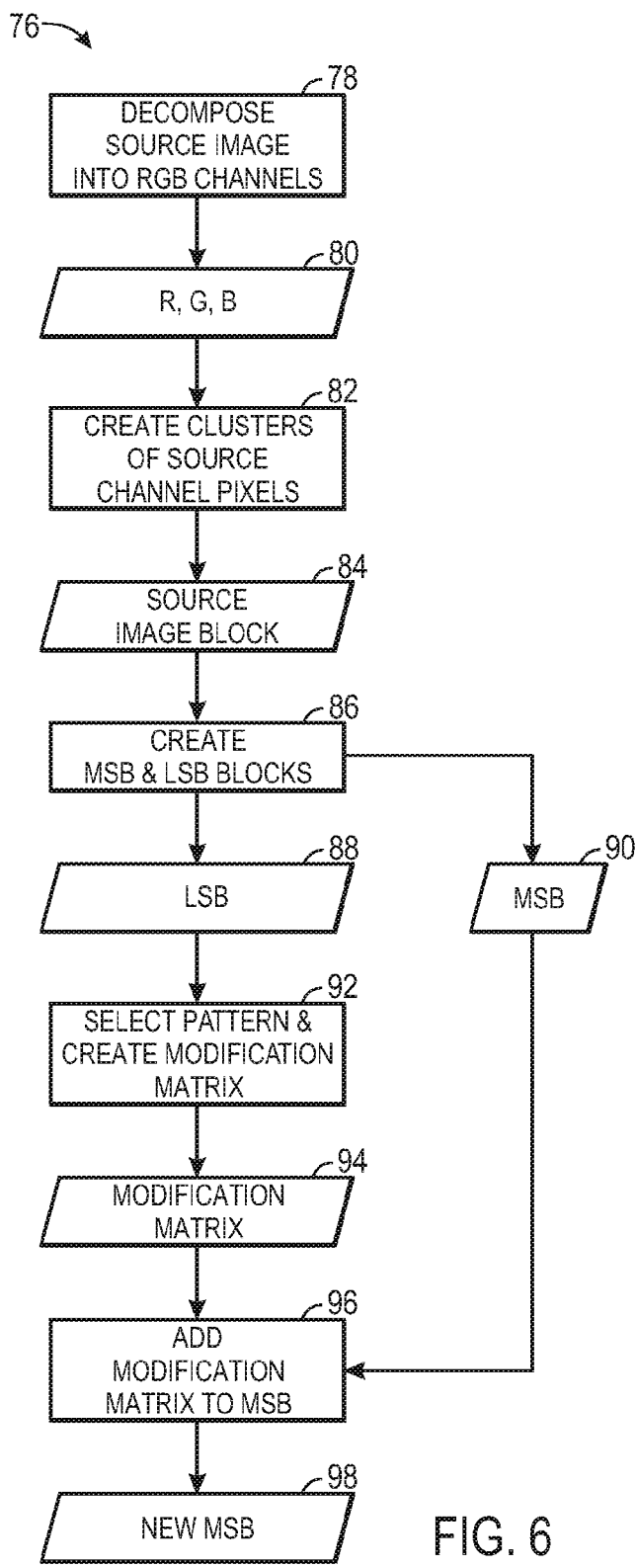
FIG. 6 is a logic diagram illustrating an operation of the device of FIG. 1, in accordance with aspects of the present disclosure.

FIG. 6 is illustrative of an embodiment of a logic 76 capable of utilizing MSB-LSB techniques to spatially and temporally dither the source image 62. That is, the logic 76 is capable of transforming the image 62 having a higher pixel depth into the displayed image 74 having a lower pixel depth. Accordingly, the logic 76 may include non-transitory machine readable code or computer instructions that may be used by a processor, for example, to transform image data. The source image 62 may first be decomposed (block 78) into three R, G, B, channels 80. In one embodiment, three M×N matrices may be created based on the M×N source image resolution, each matrix corresponding to one of the three color channels 80. Accordingly, the values included in each cell of a red channel matrix (R) correspond to the red intensity values of each pixel, the values of each cell in a green channel matrix (G) correspond to the green intensity values of each pixel, and the values of each cell in a blue channel matrix (B) correspond to the blue intensity values of each pixel.

Each R, G, B color channel matrix 80 may then be subdivided (block 82) into multiple source image groups (e.g., matrices) 84 corresponding to different areas of the image. In one example, a group 84 is sized as 4×4 pixel group having a total of 16 pixels. Accordingly, the subdivision (block 82) of the source image 62 may be accomplished by selecting multiple 4×4 adjacent pixel groups 84 so as to partition the entire image into the 4×4 pixel groups 84. Each 4×4 pixel group 84 may then be used to create (block 86) a corresponding LSB group 88 and MSB group 90, as shown in more detail with respect to FIG. 7. The LSB group 88 and the MSB group 90 may be created by dividing the pixel depth information of each pixel into two values, a LSB value and a MSB value. The LSB values of the all the pixels in the group may then be used to create the LSB group 88. Likewise, the MSB values of the all the pixels in the group may then be used to create the MSB group 90.

To arrive at the MSB and LSB values, the pixel's color value may be provided in, or converted to, a binary value. The binary value may then be divided into two binary values, the LSB value and the MSB value. The most significant bits equal to the pixel depth (e.g., 6 bits) of the display device 28 are selected as the MSB value and the remainder bits are selected as the LSB value. As an example, suppose that the original image is stored at a 9-bit pixel depth and the display 28 is a 6-bit pixel depth display. If the original pixel color channel has a decimal color value of forty-four, the resulting binary number is "000101100". The six most significant bits are "000101", which corresponds to the decimal number five. Accordingly the MSB value becomes equal to the number five. The remainder three binary bits of "100" correspond to the decimal number four. Accordingly, the LSB value becomes equal to four. A dither pattern 70 may then be selected and used to create a modification matrix 94 (block 92).

In one embodiment, one of the dither patterns 70 may be selected based on the LSB value or magnitude and used to create (block 92) the modification matrix 94. Indeed, the values of the LSB group 88 may be used to define the modification matrix's 94 values, resulting in the modification matrix 94 having ones and zeros. Examples of the use of the LSB group 88 to create the modification matrix 94 based on the dither patterns 70 are described in more detail with respect to FIG. 7 below.

The modification matrix 94 may then be mathematically added (i.e., through matrix addition) to the MSB group 90 (block 96) to create a new lower pixel depth (e.g., 6 bit) MSB matrix 98. The resulting lower pixel depth MSB matrix 98 is thus capable of being displayed by the display 28. Indeed, multiple new MSB matrices 98 98 may be derived corresponding to all the pixels groups of the source image 94. The multiple new MSB matrices 98 may then be displayed as the displayed image 74.

Figure 7:
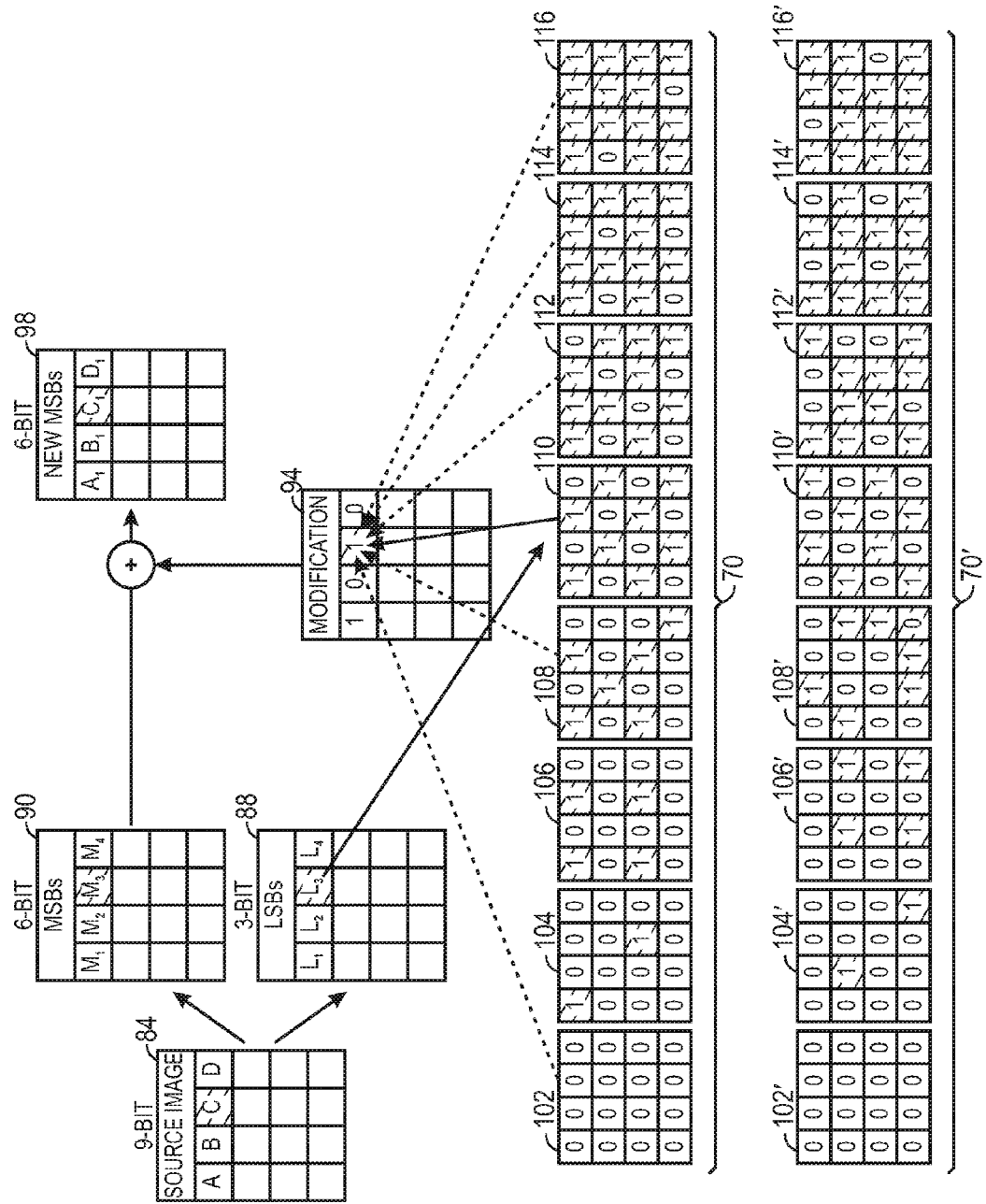
FIG. 7 is a block diagram generally representative of certain aspects of the logic of FIG. 6, in accordance with aspects of the present disclosure.

FIG. 7 depicts an example set of source image pixel group 84, LSB group 88, MSB group 90, dither patterns 70, and new MSB matrix 98 having values illustrative of the transformation of an individual color channel (e.g., R, G, or B) of a source image 62 into a displayed image 74 color channel by using logic 76 as described above. A source image group 84 may contain four values (e.g., 9-bit values), A, B, C, D, in a first row corresponding to an individual color channel (e.g., R, G, or B). For illustration purposes, we can assign some example decimal values as follows: A="141", B="411", C="44", and D="480". It is to be understood that any numeric value may be assigned to A, B, C, or D, and that other rows of the source image group 84 may include additional values. The 9-bit binary representation of values then becomes as follows: A="010001101", B="110011011", C="000101100", and D="111100000".

The most significant bits (e.g., six bits) of the source image values A, B, C, and D, may then be used to derive the values $M_1$="010001", $M_2$="110011", $M_3$="000101", $M_4$="111100", of a first row of the MSB group 90. The number of most significant bits may be based on the pixel depth of the display 28. For instance, six bits may be selected as the most significant bits if the display 28 is capable of a 6-bit pixel depth. Should the display be capable of, for example, only a 4-bit pixel depth, then the first four bits of the source image values could be used. For the 6-bit pixel depth example, the decimal values for the 6-bit binary values are $M_1$="17", $M_2$="51", $M_3$="5", $M_4$="60".

The remainder three bits of the of the source image values A, B, C, D, may then be used to derive the binary values $L_1$="101", $L_2$="011", $L_3$="100", $L$="000", of a first row of the LSB group 88. The decimal values equivalent to the 3-bit binary values are $L_1$="5", $L_2$="3", $L_3$="4", $L_4$="0". One of the dither patterns 70 (e.g., individual dither patterns 102, 104, 106, 108, 110, 112, 114, and 116) may then be selected and used to create the modification group 94 based on the LSB group 88. In the depicted example, the dither pattern 110 is selected. In certain embodiments, a dither pattern, such as dither pattern 110, is selected based on the LSB group 88 as described in more detail below. Once selected, the dither pattern 110 and the LSB 88 may be used to create the modification matrix 94.

In one embodiment, the value (i.e., magnitude) of each cell of the LSB 88, such as cells $L_1$, $L_2$, $L_3$, and $L_4$, is used to select one of the dither patterns 70. Because the values of the 3-bit LSB cells may vary from the decimal value "0" to the decimal "7", there are eight possible values. Accordingly, eight dither patterns 70 are provided when using the 3-bit LSB 88. It is to be understood that when the LSB 88 stores more (or less) binary bits, then more (or less) dither patterns 70 may be provided. For example, when using a 2-bit LSB 88, there may be four (i.e., $2^2$) dither patterns 70 provided. Likewise, when using a 4-bit LSB 88, sixteen (i.e., $2^4$) dither patterns 70 may be provided.

The magnitude or value of the 3-bit binary number stored in each cell of the LSB 88 may then be used to select one of the eight illustrated dither patterns 70. For example, cell $L_4$ of the LSB 88 may have the value "0", which corresponds to the first of eight possible values "0" to "7". Accordingly, the first dither pattern 102 of the eight dither patterns 70 may be selected. Similarly, the cell $L_3$ contains the value "4", which corresponds to the fifth of eight possible values "0" to "7". Accordingly, the fifth dither pattern 110 may be selected. Likewise, the cell $L_2$ contains the value "3" which corresponds to the fourth dither pattern 108. $L_1$ contains the value "5", which in turn corresponds to the sixth dither pattern 112. In this way, the first row of the LSB group 88 containing the cells $L_1$, $L_2$, $L_3$, and $L_4$, may map to one of the dither patterns 70. All other cells of the LSB group 88 may be mapped to one of the dither patterns 70 in a similar manner.

As mentioned above with respect to FIG. 5, in certain embodiments, two sets of dither patterns 70 and 70' may be used. For example, the dither patterns 70 illustrated in FIG. 7 may be used with the green color channel. The set of dither patterns 70' may then be used with the colors red and blue. This second set of dither patterns 70' may be derived by shifting the ones and zeros of each of the illustrated dither patterns 104, 106, 108, 110, 112, 114, and 116 so as to more homogenously distribute luminance. For example, a dither pattern 104' may be used with the colors red and/or blue, where the first value "1" found in the dither pattern 104 at position (1,1) may have been shifted to position to position (2,2). Likewise, the second value "1" found in the dither pattern 104 at position (3,3) may be shifted to a position (4,4) in the dither pattern 104'. Such a phase shifting of the values from 104 to 104' may enable a more homogenous distribution of the overall luminance because the green values (e.g., when using dither pattern 104) are counterbalanced with the red and blue values (e.g., when using dither pattern 104').

Indeed, all dither patterns 104, 106, 108, 110, 112, 114, and 116 may be phase-shifted into dither patterns 104', 106', 108', 110', 112', 114', and 116' so as more homogeneously distribute the luminance. As mentioned above, the phase-shifting may be accomplished by shifting the "1" values to counterbalance the effect on luminance of the previous position of the "1" values. For example, dither pattern 108' may be arrived at having a first row "0 1 0 0", a second row "1 0 0 1", a third row "0 0 0 1" and a fourth row "0 1 1 0" by counterbalancing the effect of the "1" values of dither pattern 108. In yet another example, a dither pattern 116' may be arrived at having a first row "1 0 1 1", a second row "1 1 1 1", a third row "1 1 1 0", and a fourth row "1 1 1 1" by counterbalancing the effect of the "1" values of the dither pattern 116.

Once one of the dither patterns 70 (or 70') is selected, then the LSB group 88 may again be used to select one of the cells in each of the selected dither patterns 70 (or 70'). To make such a cell selection, the position of each cell in the LSB group 88 is used to "point" to the same position in the selected dither pattern 70 (or 70'). In the depicted example, $L_3$ may first be used to select the dither pattern 110 and then $L_3$'s cell position may be used to select one of the cells of the dither pattern 110. $L_3$ is positioned in the first row, third column cell. Accordingly, the cell in the first row, third column of the dither pattern 110 may then be selected. The value in this first row, third column cell (i.e., "1") of the dither pattern 110, may then be used to fill the cell at the same position (i.e., first row, third column) in the modification matrix 94. Likewise, the cells $L_1$, $L_2$, and $L_4$ may be used. For example, $L_1$ is in the first row, first column of the LSB group 88, so the first row and first column value of the dither pattern 112 (i.e., "1") is copied to the first row and first column cell of the modification matrix 94. Similarly, $L_2$ is in the first row, second column of the LSB group 88, so the first row and second column value of the dither pattern 108 (i.e., "0") is copied to the first, row second column cell of the modification matrix 94. In a similar way, the value (i.e., "0") of the cell in the first row, fourth column of the dither pattern 102 is copied into the first row, fourth column cell of the modification matrix 94. By using this methodology, all of the cells of the modification matrix 94 may be derived as having a zero or a one.

The MSB block 90 may then be added to the modification matrix 94 by using, for example, matrix addition. That is, every cell in the MSB block 90 may be added to the corresponding cell in the modification matrix 94. The result of the addition operation is a new MSB block 98. Using the numbers used in the depicted example, the decimal values for the first row of the new MSB block 98 are $A_1$="17"+"1"="18", $B_1$="51"+"0"="51", $C_1$="5"+"1"="6", and $D_1$="60"+"0"="60". The remaining rows of the new MSB block 98 may then be similarly computed based on the values for the corresponding rows of the source image block 84. As mentioned above, the new MSB block 98 may include color values at a lower pixel depth than the source image block 84 suitable for display by the display 28. Indeed, the dithering techniques disclosed herein allow for the creation of multiple new MSB blocks 98 suitable for displaying the higher pixel depth (e.g., 9-bit) source image 62 at a lower pixel depth (e.g., 6-bit).

Figure 8:
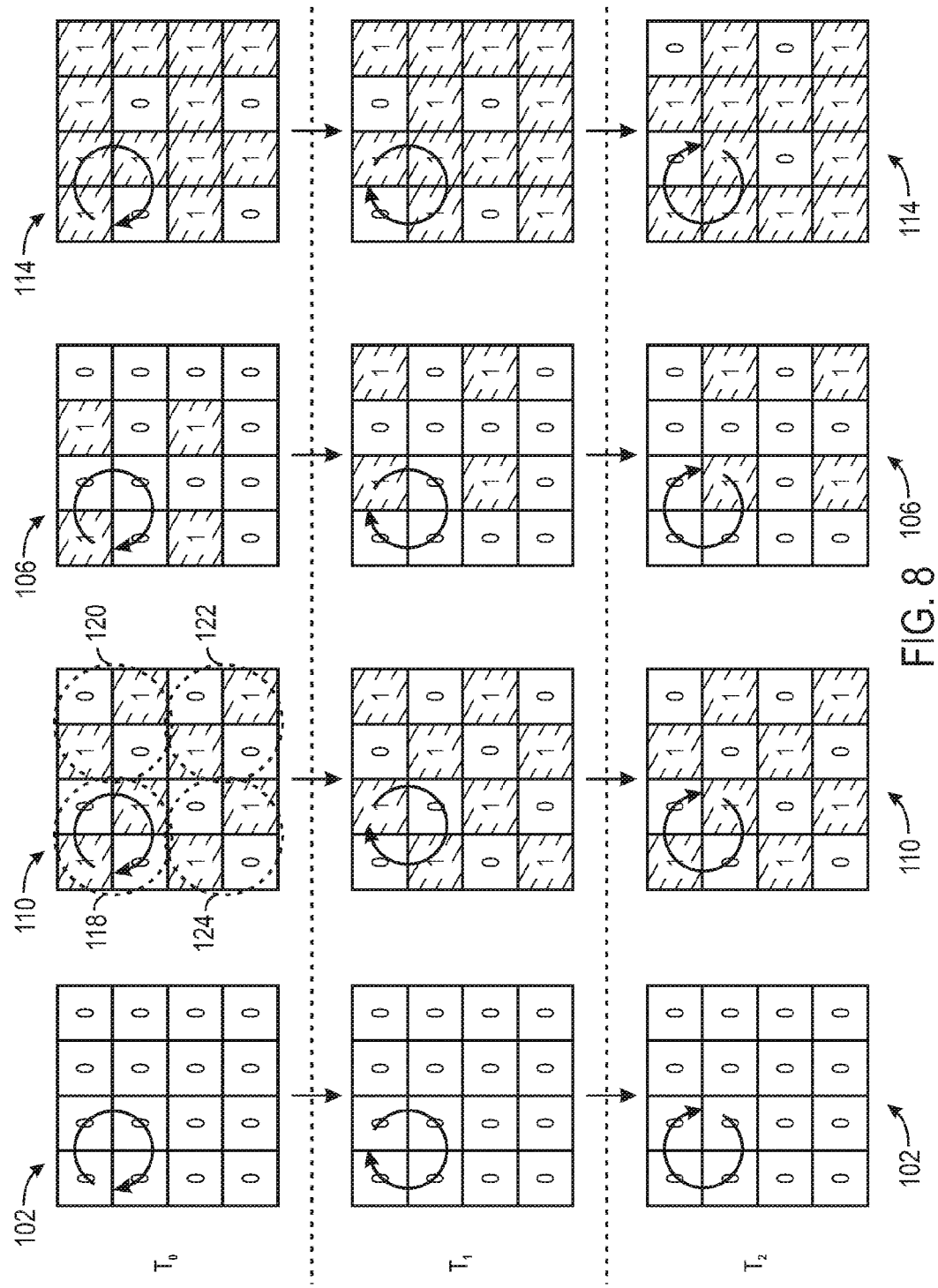
FIG. 8 is a block diagram illustrating the use of temporal dithering, in accordance with aspects of the present disclosure.

Turning to FIG. 8, the figure depicts an example of dither patterns 102, 110, 106, and 114, as they may be temporally dithered. Indeed, any of the dither patterns 70 may be temporally dithered in some embodiments, and such temporal dithering of the dither patterns 70 may be used in addition to the LSB-MSB techniques described above to further transform the source image 62. FIG. 8 depicts three rows, each row representing a temporal frame at times $T_0$, $T_1$, and $T_2$. In the depicted temporal dithering embodiment, a first row shows an example of an initial condition (i.e., position of the zero and ones) at time $T_0$ for each of the dither patterns 102, 110, 106, and 114. Time $T_0$ may correspond to the display of the first frame of the image, as mentioned above. Accordingly, the example depicted dither patterns 102, 110, 106, and 114 may be used to create the modification matrix 94 at time $T_0$ using the methodology described above with respect to FIG. 7. The modification matrix may then be used to transform the source image 62 into a displayed image 74 at time $T_0$.

The second row of the depicted example corresponds to time $T_1$. As illustrated, the bits of the dither patterns at time $T_1$ have been temporally shifted from their positions at time $T_0$. In certain embodiments, the shift of the bits is accomplished by a clockwise rotation of the bits. In one example, each of the dither patterns may be divided into a top left quadrant 118, a top right quadrant 120, a bottom right quadrant 122, and a bottom left quadrant 124, each quadrant having four bits. In this example, each of the quadrants may have the bits rotated in a clockwise direction as depicted in FIG. 8. For example, the top row (e.g., top two bits) of the depicted quadrant 118 of the dither pattern 110 has shifted from storing the bits "1" and "0" at time $T_0$ to storing the bits "0" and "1" at time $T_1$. Additionally, the bottom row (e.g., bottom two bits) of the aforementioned quadrant 118 has shifted from storing the bits "0" and "1" at time $T_0$ to storing the bits "1" and "0" at time $T_1$. Accordingly, the example depicted dither patterns 102, 110, 106, and 114 at time $T_1$ may be used to create the modification matrix 94 as described above. The modification matrix 94 may then be used to transform the source image 62 into a displayed image 74 at time $T_1$.

A third row in FIG. 8 corresponding to time $T_2$ may then be similarly created (e.g., by shifting of the bits in each quadrant) and used to display a frame of the image at time $T_2$. In the depicted example, the top row of quadrant 118 of the dither pattern 110 has shifted from storing the bits "0" and "1" at time $T_1$ to storing the bits "1" and "0" at time $T_2$. Likewise, the bottom row of the quadrant 118 has shifted from storing the bits "1" and "0" at time $T_1$ to storing the bits "0" and "1" at time $T_2$. The other quadrants 120, 122, and 124 may be similarly shifted as the dither patterns 70 undergo temporal dithering. Such temporal dithering of the dither patterns may allow the resulting displayed image 74 to be perceived as having a higher visual quality because the human eye may perceive the multiple frames displayed sequentially in time as a single frame having an improved image quality.

Figure 9:
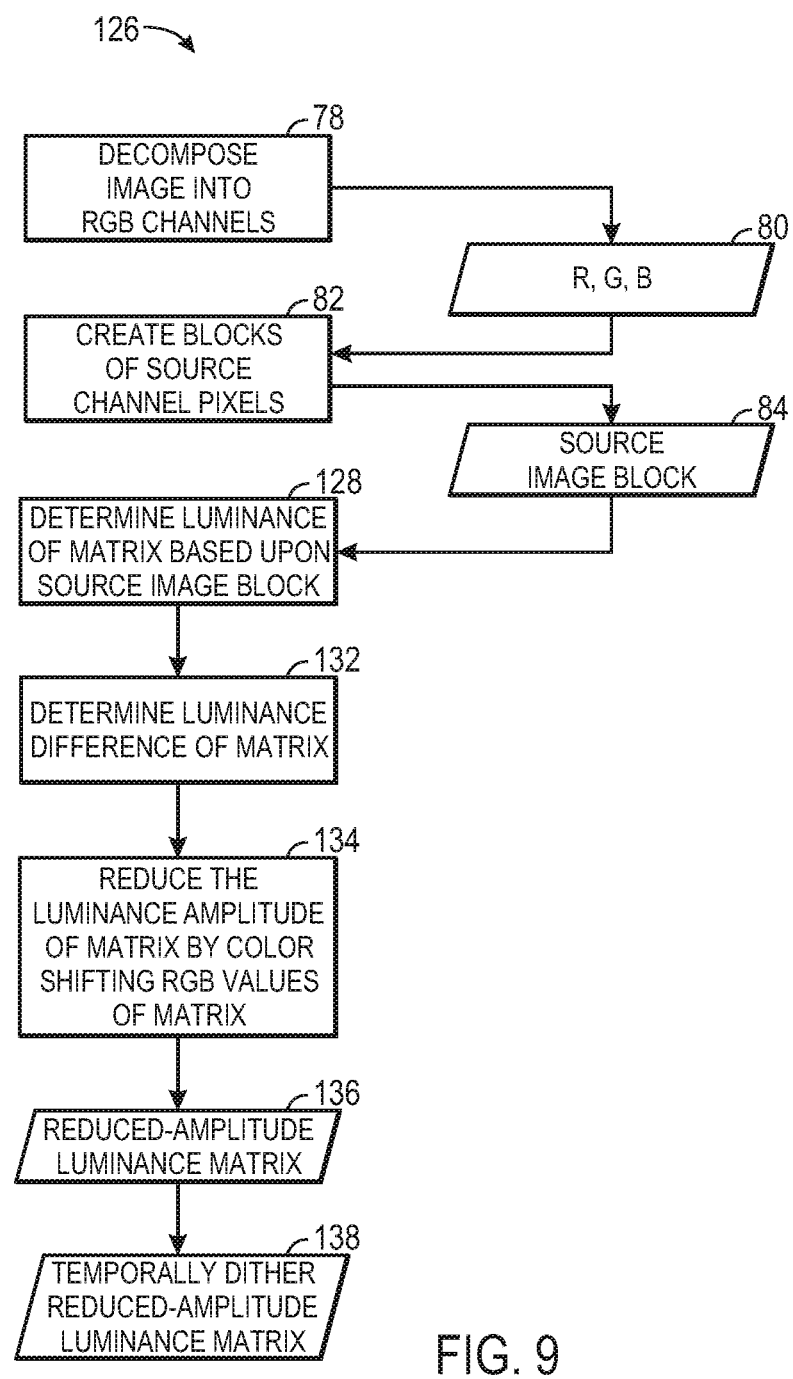
FIG. 9 is a second logic diagram illustrating an operation of the device of FIG. 1, in accordance with aspects of the present disclosure.

FIG. 9 is illustrative of a logic 126 capable of employing spatial, temporal, and/or luminance-based dithering techniques so as to enhance the visual quality of a lower pixel-depth image. The logic 126 may include non-transitory machine readable code or computer instructions that may be used by a processor, for example, to transform image data. As mentioned above with respect to the logic 76, the source image 62 may first be decomposed (block 78) into three R, G, B, channels 80. That is, three M×N matrices may be created based on the M×N source image 62 resolution, each matrix corresponding to one of the three color channels 80 (e.g., red, green, blue). Accordingly, the values included in each cell of the red channel matrix (R) correspond to the red color values of each pixel, the values of each cell in the green channel matrix (G) corresponds to the green color values of each pixel, and the values of each cell in the blue channel matrix (B) corresponds to the blue color values of each pixel.

Each R, G, B color channel matrix 80 may then be used (block 82) to create multiple source image groups (e.g., matrices) 84 corresponding to different areas of the image, or to different pixels of the image, with each cell in the group having an red, green, and blue color component. In certain embodiments of the source group 84, the group is sized as 2×2 pixel group having a total of 4 pixels. In one embodiment, the values for each of the pixels in the source group 84 may be derived from a single pixel of the source image. That is, the RGB values of a source image pixel may be copied into the 2×2 pixel group 84. In other embodiments, multiple 2×2 adjacent pixels of the source image may be copied into the 2×2 pixel group 84. Accordingly, the entire image may be divided either pixel by pixel or by selecting adjacent pixels. It is to be understood that, in other embodiments, other sizes of source image groups 84 may be used, for example, 4×4, 6×6, 8×8, and so forth.

Figure 10:
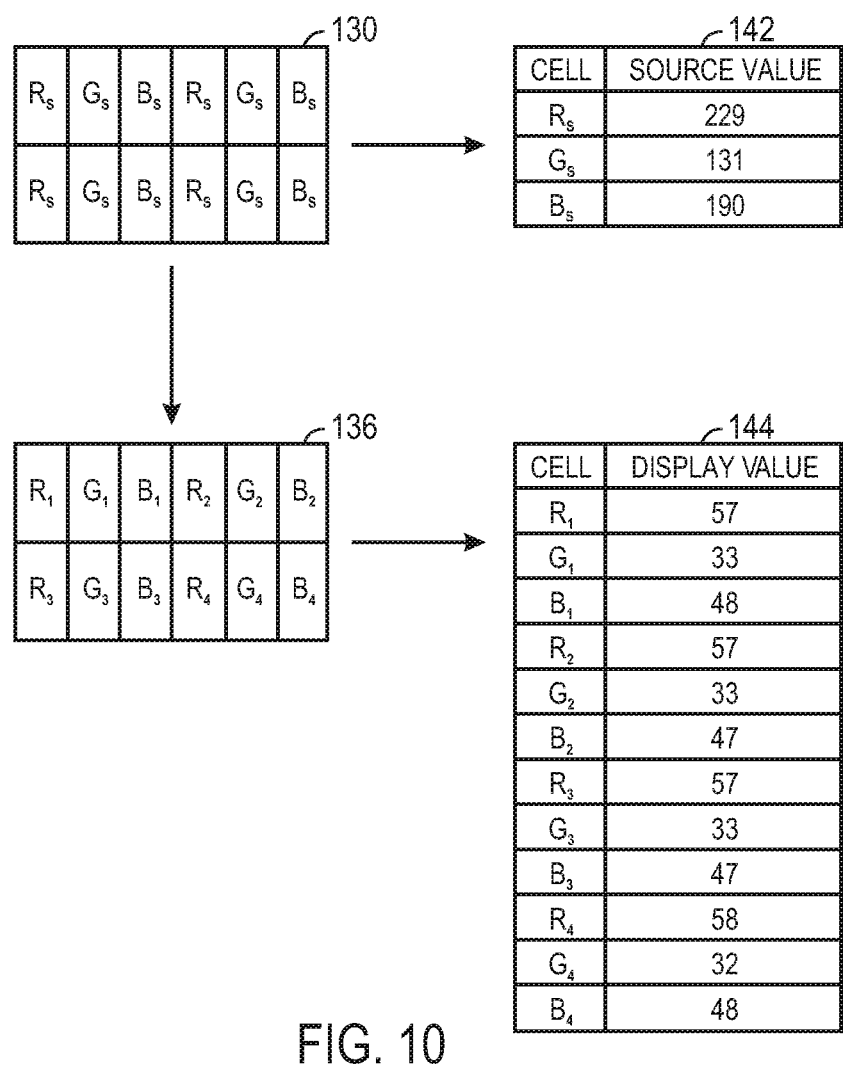
FIG. 10 is a block diagram generally representative of certain aspects of FIG. 9, in accordance with aspects of the present disclosure.

A luminance value of each cell in the source image group 84 may then be determined (block 128), for example, through the use of the luminance formula Y described above. A matrix of source image RGB values may then be derived based on the color values of each cell in the source image group 84. The source image RGB matrix may include four cells where each cell includes three sub-cells, each sub-cell storing a luminance for each RGB channel. An example 4×4 source image RGB matrix is shown in FIG. 10 below. The source image RGB matrix may then be used to derive a displayed image RGB matrix having a reduced luminance amplitude. That is, a higher pixel depth (e.g., 8-bit depth) RGB matrix may be converted into a lower pixel depth (e.g., 6-bit) RGB matrix suitable for display by the display device 28. During or after the conversion from the higher pixel RGB matrix to the lower pixel RGB matrix, the luminance values for the cells of the lower pixel RGB matrix may be used to determine a luminance difference (block 132) of the lower pixel RGB matrix. In one embodiment, the luminance difference may be calculated by using the highest and the lowest luminance values in the lower pixel depth RGB matrix to find the largest luminance difference in the lower pixel RGB matrix. In certain embodiments, the luminance difference or amplitude is minimized by color shifting the RGB values of each sub-cell of the lower pixel depth RGB matrix (block 134). In one embodiment, a set of rules may be used to more evenly distribute the luminance values of the RGB matrix, as described in more detail below. In other embodiments, other techniques such as creating a reduced-amplitude luminance matrix 136 and then using the luminance values of the matrix to re-assign RGB values may be used that results in the displayed image 74 having less differences between luminance values (i.e., reduce amplitude between values).

In one example, the color shifting (block 134) reduces the overall luminance amplitude by dividing the luminance of each source image RGB channel into four lower pixel depth values. That is, a higher pixel depth value, such as an 8-bit value may be divided into four lower pixel depth values, such as four 6-bit values. The overall luminance difference of the lower pixel are reduced by reapportioning the red, green, and color values of the four lower pixel depth RGB values so as to result in a reduced-amplitude luminance matrix 136 that has more homogenous luminance values. That is, the RGB color components of the cells in the reduced-amplitude luminance matrix are distributed spatially (e.g., moved from one cell to another cell) so as to reduce the luminance amplitude (e.g., luminance difference of the highest luminance versus the lowest luminance) of the reduced-amplitude luminance matrix 136. An example of such a spatial distribution of values is described in more detail with respect to FIG. 10 below. The color shifting (block 134) thus results in the reduced-amplitude luminance matrix 136 that is capable of improving the quality of perception of a displayed image 74. Indeed, the reduced-amplitude luminance matrix 136 may be able to minimize gradations between adjacent luminance and/or color levels so as to present a displayed image 74 that is more pleasing and natural to the human eye. Additionally, the reduced-amplitude luminance matrix 136 may undergo a temporal dithering (block 138) to as to further enhance the visual quality of the resulting displayed image 74. An example of temporal dithering is described in more detail below with respect to FIGS. 11-14.

Turning to FIG. 10, the figure depicts an example of a reapportioning (i.e., color-shifting) of the RGB values so as to visually improve luminance homogeneity, as has been previously described in relation to the logic 126 above. It may be useful to explain the logic 126 by using example numeric values. Accordingly, FIG. 10 illustrates example RGB values and describes how such example values may result in a reduced-amplitude luminance matrix 136. In the depicted example, the source image RGB matrix 130 includes four cells divided into three sub-cells, each sub-cell storing an R, G, or B value. As mentioned earlier, the RGB values may be arrived at by decomposing a pixel color into its RGB color components and storing such components in a source image group 84. The source image group 84 may then be used to create the source image matrix 130 having a higher pixel depth (e.g., 8-bit pixel depth) suitable for transformation into the reduced-amplitude luminance matrix 136 having a lower pixel depth (e.g., 6-bit pixel depth). In the depicted embodiment, each sub-cell of the source RGB matrix 130 stores the same image source color values (i.e., $R_s$, $G_s$, and $B_s$) as each other sub-cell.

A table 142 depicts example decimal values for $R_s$, $G_s$, and $B_s$ (e.g., "229", "131", and "190"). Because the values in the source image RGB matrix 130 are stored at a higher pixel depth (e.g., 8-bits), the values may need to be transformed to lower bit values (e.g., 6-bit pixel depth values) in order to allow display by the display 28. In one embodiment, each of the $R_s$, $G_s$, and $B_s$ values (e.g., 8-bit values) may first be converted into lower pixel depth integer values (e.g., 6-bit values). One such conversion from an 8-bit value into a 6-bit value may include dividing the original source value by four (i.e., divide by $2^2$). In another conversion, the first six bits of the 8-bit values may be used to arrive at the 6-bit value. In the depicted embodiment, the resulting decimal values for the conversion are depicted as $R_1$, $R_2$, $R_3$, and $R_4$.

It is to be noted that the conversion from a higher pixel depth value into a lower pixel depth may result in the numbers having fractional components. For example, for the $R_s$ value of "229", a division by four results in the number "57.25" having the fractional component "0.25". Because the hardware may not be suitable for displaying fractional color levels, the fractional component is usually not used. In one embodiment, the original source value "229" is approximated by using four lower-pixel depth values $R_1$, $R_2$, $R_3$, and $R_4$ set to "57", "57", "57", and "58", respectively. Likewise, the $G_s$ value of "131" may result in $G_1$, $G_2$, $G_3$, and $G_4$ set to "32", "33", "33", and "33", respectively. Similarly, the $B_s$ value of "190" may result in $B_1$, $B_2$, $B_3$, and $B_4$ set to values "47", "47", "48", and "48", respectively. These four sets of values representing the lower pixel-depth bit (e.g., 6-bit) values may then be color-shifted, that is, distributed spatially so as to reduce the luminance amplitude of the matrix 136.

In order to reduce the luminance amplitude of the matrix 136, a luminance difference may be first calculated by finding a highest luminance value and a lowest luminance value based on all the RGB values of the luminance matrix 136, by using, for example, the luminance equation Y. In our example, the highest luminance value could be obtained with a cell having the values R="58", G="33", and B="48". The lowest luminance value could be obtained with a cell having the values R="57", G="32", and B="47". But in some embodiments, the luminance difference may be adjusted by increasing or decreasing the values for red, green, and blue to reduce luminance variation within the matrix 136. Increasing or decreasing the green value (while keeping the other colors the same) has the greatest perceived effect on luminance, based on the perceived luminance equation Y described above. Increasing or decreasing the color red (while keeping the other colors the same) has second greatest effect on luminance, and increasing or decreasing the color blue (while keeping the other colors the same) has the least perceived effect on luminance.

In certain embodiments, an algorithm, such a value optimization algorithm (e.g., greedy algorithm), may be used to assign the sets of values into specific cells (e.g., spatially distribute the values) so as to minimize the luminance difference of the reduced-amplitude luminance matrix 136 by using the luminance Y equation to more evenly distribute the integer values. For example, the algorithm may first assign the four $R_1$, $R_2$, $R_3$, and $R_4$ values by increasing order, random order, or any other ordering. A table 144 of display luminance values depicts the four $R_1$, $R_2$, $R_3$, and $R_4$ values assigned by increasing order (e.g., $R_1$="57", $R_2$="57", $R_3$="57", and $R_4$="58"). The four green values may then be assigned to minimize the red-green luminance difference between the four cells. For example, if a cell has a high red value compared to one or more other cells, then the cell may be used to store a low green value (compared to one or more other cells). In the depicted example, the highest red value is stored in $R_4$, therefore, $G_4$ may get the lowest green value.

The blue color values may then be similarly assigned so that the resulting luminance difference of the reduced-amplitude luminance matrix 136 is lowered or minimized. For example, the lowest blue value of "47" may be assigned to the cells having red="57" and green="33" (e.g., second and third cells) of the matrix 136 to counterbalance an assignment of a blue value of "48" to the fourth cell of the matrix 136. A high perceived luminance value $Y_H$="41.7" for the reassigned matrix 136 may then found in the first cell having the values $R_1$="57", $G_1$="33", and $B_1$="48". A low luminance value $Y_L$="41.4" for the matrix 136 may be found in the fourth cell having the values $R_4$="58", $G_4$="32", and $B_4$="48", with the luminance values of the second and third cells falling between $Y_L$ and $Y_H$. It is to be understood that any algorithm, including brute force search algorithms, suitable for spatially redistributing the sets of values (e.g., $R_1$, $R_2$, $R_3$, $R_4$, $G_1$, $G_2$, $G_3$, $G_4$, $B_1$, $B_2$, $B_3$, and $B_4$) may be used to derive the reduced-amplitude luminance matrix 136.

In one embodiment, the values of the reduced-amplitude luminance matrix 136 may then be used to display a more improved and visually pleasing displayed image 74. In another embodiment, such as the embodiment described in more detail below with respect to FIGS. 11-14, the reduced-amplitude luminance matrix 136 may be temporally dithered in order to further improve the visual perception of the displayed image 74.

Figures 11, 12, 13, 14:
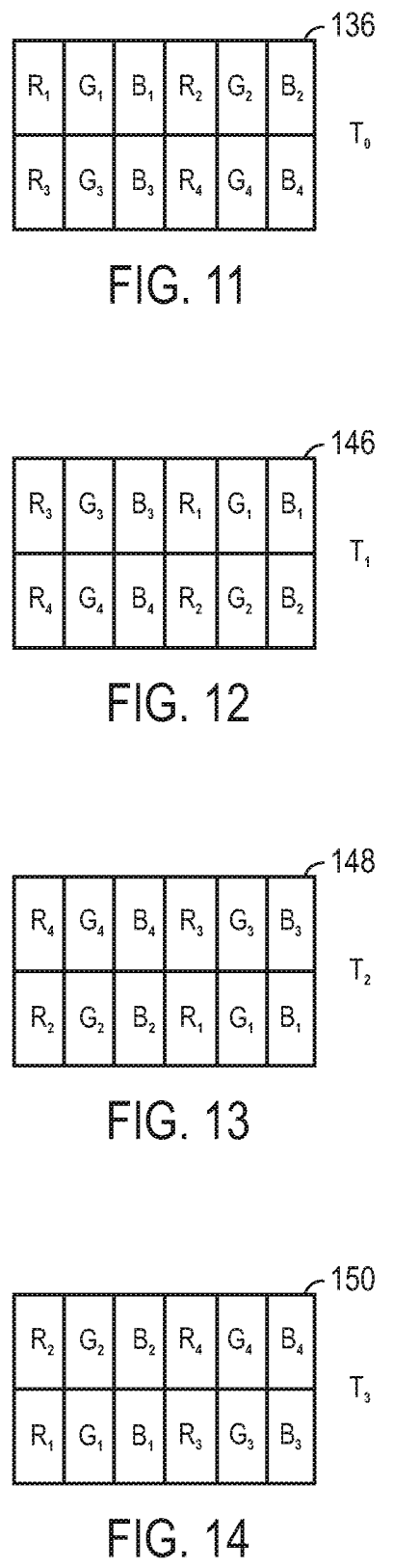

FIGS. 11-14 depict an embodiment of the use of temporal dithering to improve the visual perception of the reduced-amplitude luminance matrix 136. Turning to FIG. 11, the figure depicts the matrix 136 at time $T_0$. As mentioned above, the values for $R_1$, $R_2$, $R_3$, $R_4$, $G_1$, $G_2$, $G_3$, $G_4$, $B_1$, $B_2$, $B_3$, and $B_4$ may have been distributed so as to result in a more homogenous luminance for the matrix 136. Temporal dithering of the matrix 136 may result in a further improvement the perceived visual aspects of the image. Accordingly, FIG. 12 illustrates a temporal dithering of the cells at time $T_1$. A resulting temporally dithered matrix 146 depicts a clockwise temporal dithering of the cells of the matrix 136. In the depicted embodiment, the $R_1$, $G_1$, and $B_1$ values have been temporally shifted in clockwise direction to the cell that was previously storing the $R_2$, $G_2$, and $B_2$ values. Similarly, the $R_2$, $G_2$, and $B_2$ values have been temporally shifted to the cell that used to store the $R_4$, $G_4$, and $B_4$ values. The $R_4$, $G_4$, and $B_4$ values have been temporally shifted to the cell that used to store the $R_3$, $G_3$, and $B_3$ values. Finally, the $R_3$, $G_3$, and $B_3$ values have been temporally shifted to the cell that used to store the $R_1$, $G_1$, and $B_1$ values.

FIG. 13 depicts the a similar clockwise temporal dithering of the matrix 146 of at time $T_z$, resulting in a temporally dithered matrix 148. Likewise, FIG. 14 is illustrative of the clockwise temporal dithering of the matrix 148, resulting in a temporally dithered matrix 150. It is to be understood that the temporal dithering embodiment depicted in FIGS. 11-14 is but one of any number of temporal dithering embodiments that may be utilized to improve the visual perception of displayed image 74. Indeed, in another embodiment, the cells having the lowest luminance value (e.g., R="58", G="32", and B="48") and the highest luminance value (e.g., R="57", G="33", and B="47") of the initial reduced-amplitude luminance matrix 136 may be alternated with each other, and the remaining two other cells then also alternated with each other.

Figure 15:
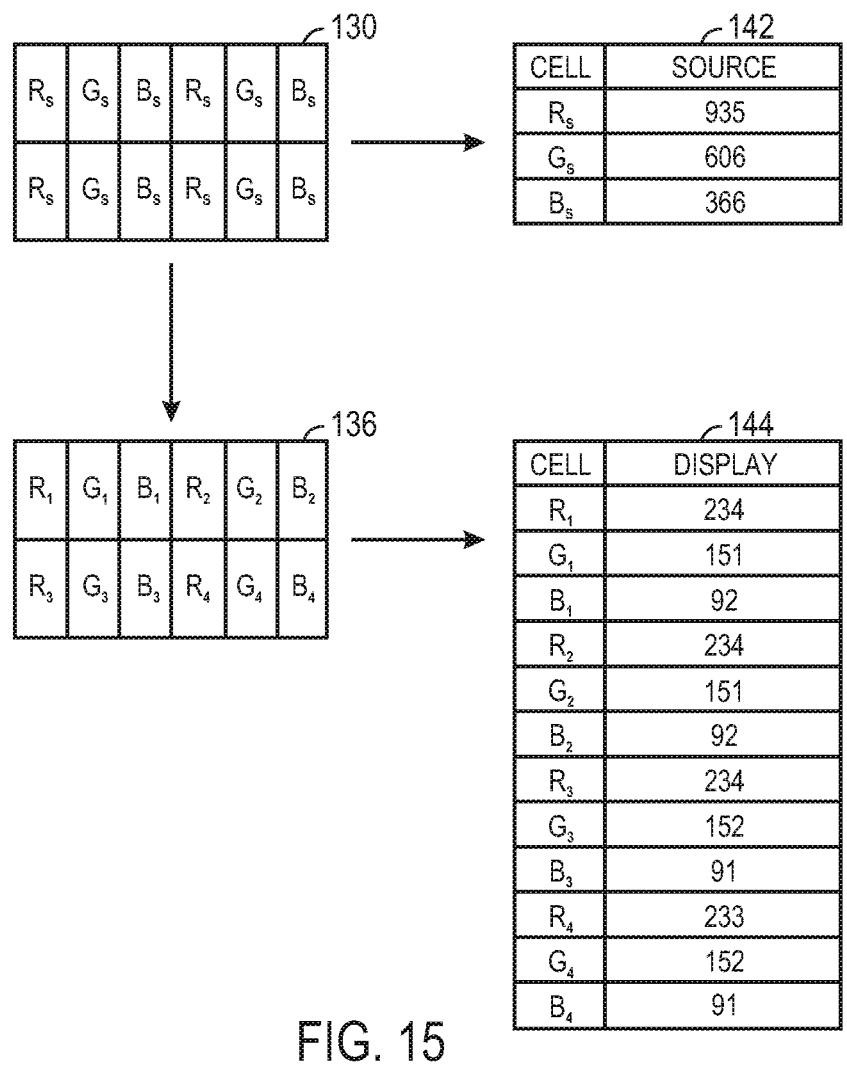
FIG. 15 is a second block diagram generally representative of certain aspects of FIG. 9, in accordance with aspects of the present disclosure.

Turning to FIG. 15, the figure depicts another example of the transformation of an example source image RGB matrix 130 into a reduced-amplitude luminance matrix 136. In this example, 10-bit source image values may be used to derive 8-bit hardware values suitable for display by the display 28. It is to be understood that in addition to a 10-bit to 8-bit conversion, any number of other conversions of higher pixel depths to lower pixel depths may be possible. Indeed, the techniques described herein may be used to convert 9-bit to 6-bit, 10-bit to 6-bit, 12-bit to 6-bit, 9-bit to 8-bit, 12-bit, to 8-bit, and so forth. As mentioned above, higher pixel depth values (e.g., 10-bit values) of the original image may be converted into lower pixel depth values (e.g., 8-bit values) by various techniques, including using the first eight bits of the 10-bit value. Example 10-bit values for $R_s$, $G_s$, and $B_s$. are show in Table 142 (e.g., "935", "606", and "366"). In one embodiment, the 10-bit value "935" may be approximated by the 8-bit values "233", "234", "234", and "234". Similarly, the 10-bit value "606" may be approximated by the 8-bit values "151", "151", "152", and "152". Likewise, the 10-bit value "366" may be value "366" may be approximated by the 8-bit values "92", "92", "91", and "91".

The reduced-amplitude luminance matrix 136 may then be arrived at by color-shifting or spatially distributing the 8-bit values so as to reduce the overall perceived luminance difference of the reduced-amplitude luminance matrix 136. In our example, the highest luminance value could be obtained with a cell having the values R="234", G="152", and B="92". The lowest luminance value could be obtained with a cell having the values R="233", G="151", and B="91". The lower pixel depth values may then be re-assigned as depicted in table 144 so as to reduce the luminance difference between the cell having the highest luminance and the cell having the lowest luminance. In this example, the four $R_1$, $R_2$, $R_3$, and $R_4$ values are first assigned by decreasing order (e.g., $R_1$="234", $R_2$="234", $R_3$="234", and $R_4$="233"). The four green values may then be assigned to minimize the red-green luminance difference between the four cells. For example, the luminance difference of the cells may be minimized by balancing the assignment of the high red value in one cell with the assignment of the high green value in another cell so as to more evenly spread the high value assignments. In the depicted example, the highest red values are stored in $R_1$, $R_2$, and $R_3$, therefore, $G_1$ and $G_2$ may get the two lowest green values (e.g., "151", "151"). The blue color values may then be similarly assigned so that the resulting luminance difference of the reduced-amplitude luminance matrix 136 is lowered or minimized. In this example, the blue value "91" may be assigned to the two cells of the matrix 136 containing the highest green values (e.g., third and fourth cells) to counterbalance the assignment of the blue value "92" to the first two cells of the matrix 136. By using the techniques described herein, the resulting displayed image 74 may be perceived as having an improved visual quality.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

I claim:

1. A system, comprising:
    a display comprising a plurality of pixels; and
    a processor configured to transmit signals representative of image data to the plurality of pixels of the display, wherein the processor is adapted to:
        decompose a source image comprising a plurality of pixels into Red (R), Green (G), and Blue (B) color components corresponding to each pixel;
        create a red source image group, a green source image group, and a blue source image group by assigning the respective RGB color components of each pixel to the red, green and blue source image groups;
        derive a matrix based on the red, green, and blue source image groups;
        determine a luminance difference between cells in the matrix, each cell including a red component, a green component, and a blue component, wherein determining the luminance difference includes determining a luminance amplitude of the matrix, the luminance amplitude of the matrix equal to the difference in luminance between a cell of the matrix having the highest luminance and a cell of the matrix having the lowest luminance based on their respective red, green, and blue components; and
        reduce the luminance amplitude of the matrix.

2. The system of claim 1, wherein the processor is further adapted to:
    temporally dither at least one of the red, green, or blue components of two or more cells in the matrix.

3. The system of claim 2, wherein the processor is adapted to temporally dither the at least one of the red, green, or blue components of the two or more cells in the matrix by temporally dithering the cells in the matrix in a clockwise direction.

4. The system of claim 1, wherein the processor is adapted to derive the matrix by deriving a lower pixel depth value from a higher pixel depth value of the red, green, or blue source image groups.

5. The system of claim 4, wherein the processor is adapted to derive the matrix by spatially dithering at least one of the RGB color components.

6. The system of claim 1, wherein the processor is adapted to reduce the luminance amplitude of the matrix by color-shifting at least one of the red, green, or blue components by distributing the color components spatially across one or more cells in the matrix such that the luminance amplitude between the most and least luminescent cells of the matrix following the color-shifting is less than the luminance amplitude between the most and least luminescent cells of the matrix before the color-shifting.

* * * * *